J. F. LIETZ

Feb. 10, 1931.

Re. 17,957

ROOF CONSTRUCTION

Original Filed June 16, 1927

Inventor;
John F. Lietz,
by Geyer & Geyer
Attorneys.

Reissued Feb. 10, 1931 Re. 17,957

UNITED STATES PATENT OFFICE

JOHN F. LIETZ, OF BUFFALO, NEW YORK

ROOF CONSTRUCTION

Original No. 1,666,939, dated April 24, 1928, Serial No. 199,260, filed June 16, 1927. Application for reissue filed December 12, 1929. Serial No. 413,675.

This invention relates to flexible composition shingles or covering units for roofs, having preferably downwardly-narrowed lower portions which are exposed when the shingles or units are laid upon a roof and having locking parts or members at their lower ends.

One of the objects of the invention is the improvement of such shingles or covering units with a view of simplifying their construction, reducing their cost of manufacture, and producing a smooth roof without bulges.

Another object is to so construct the shingles that they can be readily adjusted both vertically and laterally in laying them, in order to compensate for inequalities or misalinement, and improve the appearance of the roof.

In the accompanying drawings.

Similiar characters of reference indicate corresponding parts throughout their views.

Figure 1:
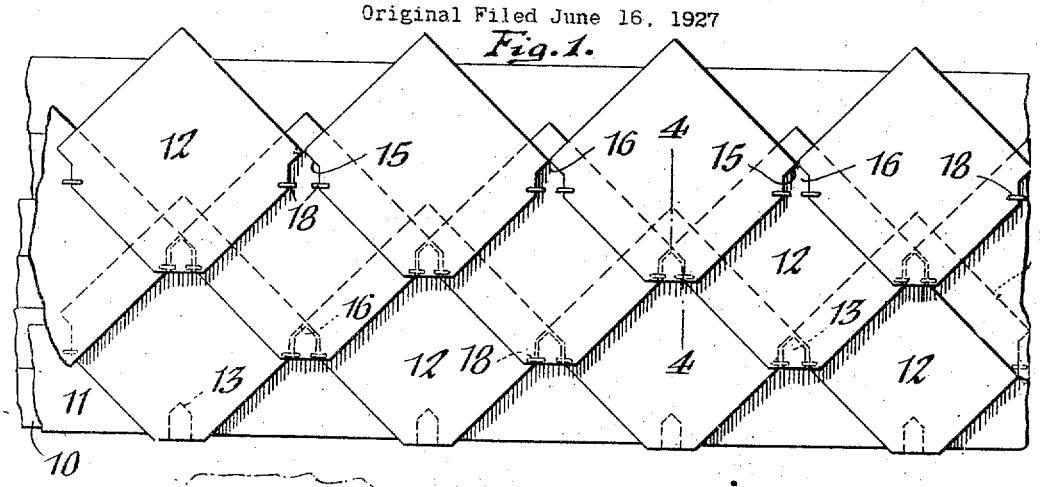
Fig. 1 is a fragmentary top plan view of a roof embodying my invention.

10 indicates the usual roof boards or sheathing, and 11 the starting strip of roofing material laid along the lower margin of the roof.

The shingles 12, or covering units as they may be termed, are preferably constructed of composition roofing, such as felt saturated with asphalt and faced with crushed slate or other appropriate material.

When using the particular shape of shingle or covering unit shown in the accompanying drawing, the shingles or units are laid diagonally in the customary overlying rows or courses, with the side corners of the shingles or units in the same row or course abutting or adjacent to each other, as shown. These side corners may be more particularly referred to as lower side corners; especially when the invention is applied to shingles or units of different outline than those shown in the drawings; but in all cases the shingles or units would be arranged in overyling rows or courses.

Roof or covering units are commonly employed in various shapes, and therefore it is within the spirit of this invention to apply the same to a shingle or unit in any of its common forms, especially since this invention relates to the formation and/or construction of the lower and medial portions of the shingle or unit and its manner of attachment or application to a roof; and having especially reference to the shingles or units in any particular row or course, to the manner of attachment or application of the shingles or units in the row or course directly beneath. In all cases, however, the lower portion of each roofing or covering unit has a narrowed lower portion or portions, preferably a downwardly-tapered or V-shaped portion or portions, and when applied to a roof the exposed portions of all shingles, when using a downwardly-tapered or V-shaped lower portion, are of substantially diamond shape. Where, therefore, reference is made hereinafter to an individual roofing or covering unit, the lower portions of the shingles or units may be V-shaped and the intervening spaces be of inverted V-formation; or such lower portions may be otherwise formed, yet assure display of spaced-apart portions having in all cases the appearance of individual shingles, which in some cases they are.

When embodying my invention in and applying the same to individual shingles or units, each shingle or unit is provided at its lower end, or corner in the event of the lower portion being V-shaped, with a tongue 13, preferably integral with the shingle-body and cut simultaneously therewith. In the preferred construction shown the tongue is formed by cutting a pair of opposing notches 14 in the edges of the lower shingle corner. This manner of cutting brings the tongue within the dimensional lines of the shingle and reduces waste of material to a minimum.

Each shingle or unit, in the case of an individual shingle, is provided at contiguous marginal portions with side notches 15, these notches being, more particularly stated, at the side corners of the shingle shown in the drawing, the two alined or registering notches of a pair of adjacent or juxtaposed shingles or units together forming a recess 16 adapted to receive the tongue 13 of a similar shingle or unit in the overlying course, allowing the tongue to lie flush with the face of the underlying shingles or units, and producing a smooth shingle over its entire surface. In other words, each course of shingles or units has the recesses 16 at the upper ends of the spaces between the narrowed lowered portions of the shingles or units, which recesses receive the tongues 13 at the lower ends of the shingles or units in the overlying course.

Figure 2:
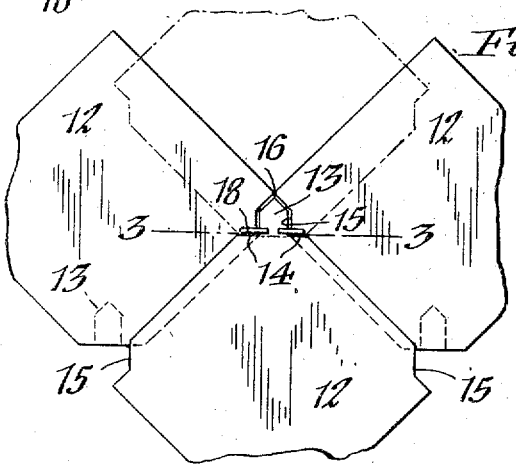
Fig. 2 is a similar view on an enlarged scale, showing one of the shingles folded back to expose its retaining or locking staples.
Figure 3:
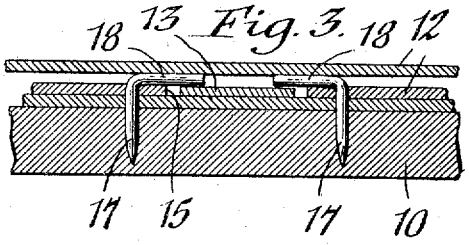
Fig. 3 is an enlarged horizontal section on line 3—3, Fig. 2.
Figure 4:
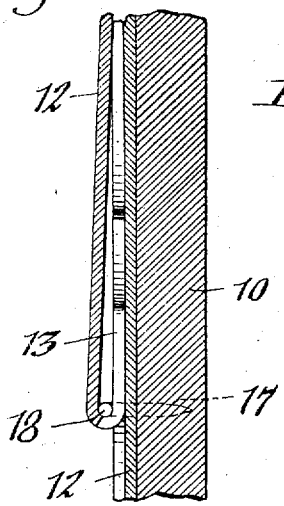
Fig. 4 is a transverse section on line 4—4, Fig. 1.
Figure 5:
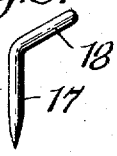
Fig. 5 is a perspective view of one of the retaining or locking staples.
Figure 6:
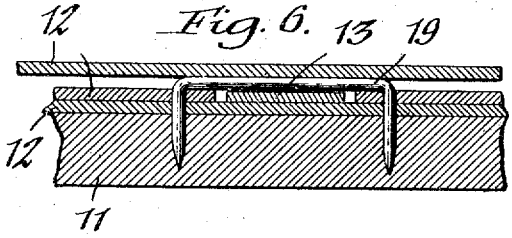
Fig. 6 is a view similar to Fig. 3, showing a modified form of a staple.

Any appropriate means may be employed to fasten or lock the shingle or unit-tongues 13 in the recesses 16. The preferred devices consist of a pair of L-shaped staples 17 driven through the bodies of the shingles or units at opposite sides of the recesses 16. In all cases, these staples have their heads overhanging or extending over the recesses, and the tongues 13 of the shingles or units of the overlying row or course are inserted under the overhanging portions of said staples, as best shown in Figs. 2, 3 and 6. The heads 18 of these staples face each other, preferably without meeting, but are of sufficient extent to overlap the margins of the locking tongue and reliably hold it in place. These staples thus serve the double purpose of retaining or locking the tongue of one shingle or unit and fastening the underlying shingles or units; in the selected form of shingle shown in the drawing, the opposing sides, or more particularly side corners, of the pair of underlying shingles being thus fastened.

In applying or locking a shingle and unit, its tongue or tongues may either be left unfolded, as shown in Fig. 2, and inserted under the heads of the staples in that position, and the shingle body then folded over the tongue to the final position shown in Fig. 1; or the tongue may be turned under the shingle or unit body and the shingle or unit then moved upward to hook the tongue under its companion staple or staples. In either case, the staples are fully concealed and protected from the weather by the shingles or units.

As the tongues of overlying shingles or units enter the notches of underlying shingles or units, the tongues can be easily inserted under the retaining members 18 or 19 without buckling; and being flush with adjoining shingles or units, the tongues do not produce bulges in the roof, leaving it flat, smooth and sightly.

The tongues of the roofing or covering shingles or units and their receiving recesses 16 are long enough to permit the shingles or units to be shifted vertically to a sufficient extent to accurately aline the shingles or units in the same horizontal row or course and yet retain the tongues with the necessary security to withstand the force of windstorms.

As shown in Figs. 2 and 3, the recesses 16 are somewhat wider than the tongues 13 to permit a certain amount of side play of the tongues. This provision enables the roofer to adjust the shingles or units laterally more or less at or near the end of the roof, or a valley, to bring the side edges or corners of all shingles or units in the same row or course against one another and produce a sightly, uniformly laid roof.

The several advantages above described are obtained by an exceedingly simple and inexpensive construction of the shingles or units and their locking devices and without sacrificing the strength and security of the lock.

The L-shaped staples are suitable at the ends of a roof or valley, as well as at other places, and they are therefore preferred; but any other appropriate means may be substituted for them. For example, ordinary U-shaped staples 19 wide enough to bridge the locking tongue and penetrate adjacent underlying shingles or units may be used, if desired, as shown in Fig. 6.

The term "preferably", wherever herein used, is intended to indicate that other forms, shapes, or devices may be employed whenever said term has reference to a form, shape, or device, and that it is to be understood that this term is not to be construed in a limited sense.

Having thus described my invention, what I claim is:—

1. In a roof construction, a pair of covering units notched at their opposite side edges, forming a recess, a third covering unit overlying said pair of units and provided at its lower end with a locking tongue lying flush in said recess, the latter being wider than said tongue, permitting lateral adjustment of said third unit relative to said pair of units, and means for retaining the tongue in said recess.

2. In a roofing construction, covering units arranged in overlying rows, each row of covering units having downwardly-narrowed lower portions forming upwardly-narrowed spaces therebetween and having also downwardly-opening recesses at the upper ends of said spaces opening to the latter, said units having locking tongues at the lower ends of their downwardly-narrowed lower portions lying flush in the recesses of the underlying row of units, said recesses being wider than said tongues to permit lateral adjustment of the units, and concealed means for fastening said units in place and for retaining said tongues in said recesses.

3. In a roofing construction, covering units arranged in horizontal rows, one row overlying another, each row of covering units having downwardly-narrowed lower portions forming upwardly-narrowed spaces therebetween and having also downwardly-opening recesses at the upper ends of said spaces opening to the latter, said units having locking tongues on their downwardly-narrowed lower portions lying flush in the recesses of the underlying row of units, said recesses being wider than said tongues to permit lateral adjustment of the units and being also of sufficient length to permit vertical adjustment of said units, and means for retaining the tongues in said recesses.

4. In a roof construction, a pair of covering units notched at their opposite side edges, forming a recess, a third covering unit overlying said pair of units and provided at its lower end with a locking tongue lying flush in said recess, the latter being wider than said tongue, permitting lateral adjustment of the units and being also of sufficient length to permit vertical adjustment of said units, and means for retaining the tongue in said recess.

5. In a roofing construction, a pair of flexible diagonally-laid shingles notched in their opposing side edges, forming a recess, a third shingle overlying said pair and provided at its lower end with a locking tongue lying in said recess, the latter being wider than said tongue, permitting lateral adjustment of the last-named shingle relative to said first-named pair, and means for retaining the tongue in said recess.

6. In a roofing construction, a pair of flexible diamond-shaped diagonally-laid shingles provided in their opposing side corners with notches, together forming a downwardly-opening recess, a third shingle overlying said pair and provided at its lower end with a locking tongue lying flush in said recess, and means for retaining the tongue in said recess.

7. In a roofing construction, a pair of flexible diamond-shaped diagonally-laid shingles provided in their opposing side corners with registering notches, forming a downwardly-opening recess, L-shaped staples whose stems penetrate the side portions of said pair respectively, while their heads extend over said notches, and a third shingle provided at its lower corner with a turned-under locking tongue lying flush in said recess and engaging under the heads of said staples.

In testimony whereof I affix my signature.

JOHN F. LIETZ.